United States Patent Office 3,551,536
Patented Dec. 29, 1970

3,551,536
TEMPERING PROCESS FOR POLYURETHANE RUBBER MATERIAL
Antone M. Guerreiro, Hawthorne, Calif., assignor to Northrop Corporation, Beverly Hills, Calif., a corporation of California
No Drawing. Continuation-in-part of application Ser. No. 550,639, May 17, 1966. This application May 13, 1968, Ser. No. 735,485
Int. Cl. B29c *25/00;* C08g *22/00*
U.S. Cl. 264—28         4 Claims

ABSTRACT OF THE DISCLOSURE

A cured polyurethane rubber product is tempered to improve its properties by heating the product to an elevated temperature below the decomposition temperature thereof, immediately submerging the heated product in a cold bath, having a temperature below −50° F., removing the product from the cold bath and allowing it to stabilize at ambient temperature.

---

This application is a continuation-in-part of application Ser. No. 550,639, filed May 17, 1966, now abandoned.

This invention relates to a tempering process for cured polyurethane rubber products and more particularly to such a process for increasing the service life as well as the toughness and recoverability of polyurethane rubber castings.

Cured polyurethane ruber castings provide a durable resilient end product suitable for a wide variety of applications. A particular application which has met with a good degree of success involves the utilization of polyurethane pads or blankets in the die forming of metallic members. In this operation, a flat polyurethane pad functions as a universal female embossing die when compressed with a steel male die. The urethane member used in this fashion facilitates die setup so that the requirements for die alignment are almost entirely eliminated. Further, the resilient pad does not mar surfaces during the stroke and has a relatively high service life. It has been found, however, that the polyurethane rubber material available in the prior art lacks the toughness and recoverability to be desired for this type of rigorous application. The process of this invention enables the fabrication of a polyurethane plastic elastomer having a substantially greater toughness and durability than polyurethane rubber products of the prior art, making such end products particularly suitable for demanding applications such as are involved in pressure forming operations of the aforementioned type.

The process of this invention achieves these improved end results by tempering the polyurethane rubber to attain substantially complete polymerization thereof and a toughening and shrinking of the skin surface to improve the durability of such surface. Such tempering is accomplished by heating the polyurethane rubber material to an elevated temperature and maintaining it at this temperature for a substantial period of time, and then suddenly liquid quenching this material in an extremely cold liquid bath. The resultant rapid cooling of the material, particularly at the surface thereof, toughens and shrinks the skin surface slightly, making it more dense, and thus making it highly durable.

It is therefore an object of this invention to improve the durability toughness, and recoverability characteristics of polyurethane rubber.

It is still another object of this invention to improve the wearability and recoverability (plastic memory) of polyurethane pads utilized in metal forming.

Other objects of this invention will become apparent as the description proceeds.

As indicated, the process of this invention is applicable to polyurethane rubbers. Particularly, the invention is directed to a process for improving polyurethane rubbers which are isocyanate-terminated polyurethane prepolymers prepared generally by reacting aromatic diisocyanates with polyalkylene ether glycols. These polyurethane rubbers are normally liquids of varying viscosity in the uncured stage. When cured with a suitable curing agent therefor, such as 4,4′ - methylene-bis-(2-chloraniline), MOCA, these rubbers then become suitable for the application of this process and ultimate utilization as pads for metal forming dies.

One of the best known forms of the polyurethane rubbers contemplated by this invention are the Adiprene series of urethane rubbers manufactured by E. I. du Pont de Nemours & Co. At present there are a series of Adiprene rubbers which include, for example, Adiprene L–100, Adiprene L–167, Adiprene L–213, Adiprene L–315, and Adiprene L–420. One of the main differences between the various foregoing Adiprenes is in the amount of isocyanate present in the polymer. For example, L–100 has an available isocyanate content of 4.10±.20%. L–167 has an isocyanate content of 6.15–6.55%, while L–315 has an available isocyanate content of 9.45±.20%. This results in the various Adiprenes having differing physical properties in the cured state. However, as indicated, it is contemplated that the entire range of such materials is contemplated for the herein invention. The Adiprene type materials are described in two basic references. The first reference is Saunders and Frisch, "High Polymers," vol. XVI, Polyurethanes: Chemistry and Technology, part II, pages 340–360. The second reference is J. J. Athey, "Chemical Compounding of Liquid Urethane Elastomers," Industrial Engineering Chemistry, vol. 52, No. 7, July 1960, pages 611–612. It can be seen, from these references, that both Adiprene 100 and Adiprene 167 are reaction products of polytetramethylene ether glycol and 2,4-tolylene diisocyanate.

Further, other materials will perform essentially the same function as the Adiprene series. An additional example of this are the Vibrathanes rubbers made by Uniroyal. For example, Vibrathane V–600 is essentially the same as Adiprene L–100, while Vibrathane V–601 is essentially equivalent to Adiprene L–167. The foregoing are specific commercially available examples of the polyurethane rubbers of this invention. However, it should be understood that any of the polyurethane rubbers utilizing a reaction product of a polyalkylene ether glycol and an aromatic diisocyanate are contemplated.

Two of the more prevalent ethers utilized to form the products include polytetramethylene ether glycol and polypropylene ether glycol. Examples of the diisocyanates often utilized include tolylene diisocyanate, diphenylmethane diisocyanate, and m-phenylene diisocyanate. The method of forming the aforegoing isocyanate-terminated polyurethane prepolymers is well known and disclosed, for example, in two basic U.S. Pats. 2,929,800 to Hill and 2,948,691 to Windemath.

In carrying out the tempering process of the invention, the polyurethane rubber material which has been normally cured is first heated to an elevated temperature. The temperature heating is generally between the cure temperature and the temperature at which the material begins to decompose. A general broad range of such temperatures for the type of materials contemplated is, for example, from above 212° F. to below 350° F. Generally it is preferred to heat the cured material at a temperature range of between 245°–255° F., since this temperature assures the result of this invention occurring, yet is not too close to the decomposition point so as to cause degradation of the material.

The purpose of the heating is to remove the cast-in strains from thte cured material. As the rubber is poured during the casting procedure, it is continually polarizing. Thus as it flows into the casting container, strains resulting from the polarization occur in the casting and are reflected in the end product. These are referred to as cast-in strains, and are readily apparent when the cured product is viewed with an instrument such as a polariscope made by the Polaroid Company, which first polarizes light in one direction and then in another in the process of taking a photograph to reflect internal strains within a plastic material or other product.

It has been found that by heating the material within the aforegoing broad temperature range, the cast-in strains can be removed. The material thus is heated for a period of time merely sufficient to remove all such strains therefrom. The length of heating can be easily determined by subjecting the material to inspection by the utilization of an instrument such as a polariscope. Normally for a material of a given thickness and size, one test sample can be run and the length of heating determined by periodic inspection. Once this has been found, repeated castings of the same material and size can be heated at the same temperature for the chosen period of time without necessitating periodic checks for the removal of the cast in strains.

In the temperature range of 245°–255° F., it has been found that the time period can vary for example from 70 to 80 hours to achieve the removal of the cast-in strains from most of the materials tested. It should be apparent that at higher temperatures the time period is naturally shortened, while at lower temperatures, the time is extended. Thus, one attempts to achieve a balance between a high temperature and short time period yet not have a point where the material might start to degrade due to such temperature.

After the material has been heated in accord with the aforegoing description, it is immediately suddenly cooled to an extremely cold temperature, below −50° F. The bath can be a liquid, such as Dry Ice in kerosene which has a temperature of −100 to −110° F., or can even be a cryogenic, such as liquid nitrogen and the like. The material is kept in the bath until sufficient time has elapsed for it to reach the bath temperature throughout the piece. Obviously, this time period depends upon the thickness of the piece. Once again, as in the heating step, the initial sample can be tested by inserting a thermocouple into the center of the piece prior to being submerged in the cold bath. Thus, one can obtain the length of time needed to achieve the temperature stability desired for repeated runs. The polyurethane rubbers are poor thermal conductors and thus the time periods to achieve the temperature stability in the cold bath are relatively long, normally from 4 to 6 hours.

After the piece has achieved the bath temperature throughout, it is then removed from the bath, dried, and exposed to room temperature of approximately 70° F., for a sufficient period for it to stabilize throughout at that temperature. This is normally reached in approximately 2 to 4 hours, dependent once again upon the thickness of the part.

As can be appreciated, the cold bath serves to thermally shock the heated material. Thus it is desired that the heated part be immediately transferred from the furnace to the cold bath with preferably no more than 5 seconds elapsing. This will maximize the desired thermal shock occurring, particularly at the outer layer of the part.

The aforegoing process greatly increases the durability of a given pad for metal forming which is made out of polyurethane. It has been found that a pad subjected to the same metal forming conditions will last 4 to 40 times longer without any degradation when the material has been treated in accord with the proceed of the invention, as compared to normal untreated pads of the exact same composition. Furthermore, the pads treated in accord with this invention showed a much quicker recovery under the same load conditions to the original shape and contour. Another advantage of the pads treated in accord with this method is that they are less readily marked by sharp edges of the metal, due to the harder surface formed thereon through the quenching step in the cold bath.

Following are specific examples of the process of the invention:

EXAMPLE I

A flat pad, 24" x 24" x ½" thick, of normally processed and cured polyurethane rubber, cast of Adiprene, L-100, was placed in an oven having a temperature of 250° F. and held at this temperature in the oven for a period of 75 hours. All of the cast-in strains were removed by the end of this period. The pad was then removed from the oven and immediately (within three seconds) completely immersed in a solution of Stoddard solvent and Dry Ice held at a temperature of approximately −105° F. The pad was retained in the solution for four hours. The pad was then removed from the solution, dried with a clean cloth and hung in a normal atmosphere having a temperature of approximately 72° F. for a period of two hours to permit the pad to stabilize at such temperature.

EXAMPLE II

A flat pad of the same material as described for Example I, but having a thickness of 2 inches, was processed as described for Example I except that the pad was retained in the quenching bath for a period of six hours and held at room temperature for four hours, rather than for the time periods indicated for Example I.

The pads prepared according to the aforegoing examples exhibited a useful life of up to 40 times longer than pads of the same size and material which were not treated in accord with the method of the invention.

It is important to note that during the time of heating of the parts the oven door should not be opened at any time, so as to avoid disturbing the temperature thereof. Further, in removing traces of solvent solution it is important that no air hose drying or the like be utilized, which might disturb the temperature of the parts. It is again noted that the parts being transferred in the shortest time possible, preferably less than five seconds, so as to achieve as abrupt a temperature change as possible.

The process of this invention thus provides means for improving the durability and resilience of urethane elastomer members, to enhance their utilization for rigorous applications such as for die pads in metal forming. The tempering process of this invention particularly affects the skin portions of the parts processed by virtue of the compressive strains built into the skin with relation to the inner parts, this in view of the liquid quenching which operates on such skin portions before the inner portions.

I claim:
1. A process for improving previously cured polyurethane rubbers formed from prepolymers which are the reaction product of an aromatic diisocyanate and a polyalkylene ether glycol comprising the steps of:
   heating the cured rubber to a temperature between its cure temperature and the temperature at which decomposition occurs for a period of time to remove cast-in strains from said rubber immediately.

quenching said heated rubber in a cold bath having a temperature below −50° F., maintaining said rubber in said bath for a period of time sufficient for it to stabilize throughout at the bath temperature, and, removing said rubber from the bath and exposing it to ambient conditions for a sufficient time to permit it to stabilize at ambient temperature.

2. The process of claim 1 wherein said rubber is heated to a temperature between 212° and 350° F.

3. The process of claim 2 wherein said rubber is heated to a temperature between 245° and 255° F.

4. The method wherein said cold bath is maintained at a temperature −100° to −110° F.

References Cited

UNITED STATES PATENTS

| | | | |
|---|---|---|---|
| 2,688,772 | 9/1954 | Sandorff | 264—346 |
| 3,130,102 | 4/1964 | Watson et al. | 264—28 |

ROBERT F. WHITE, Primary Examiner

J. R. THURLOW, Assistant Examiner

U.S. Cl. X.R.

260—75, 77.5; 264—331, 346, 348